(12) United States Patent
Lee

(10) Patent No.: US 10,695,703 B2
(45) Date of Patent: Jun. 30, 2020

(54) PURIFICATION APPARATUS FOR COMPRESSED AIR

(71) Applicant: Sang Phil Lee, Gyeongsangbuk-do (KR)

(72) Inventor: Sang Phil Lee, Gyeongsangbuk-do (KR)

(73) Assignee: Sang Phil Lee, Gyeongsangbuk-do (KR)

( * ) Notice: Subject to any disclaimer, the term of this patent is extended or adjusted under 35 U.S.C. 154(b) by 326 days.

(21) Appl. No.: 15/310,832

(22) PCT Filed: Mar. 12, 2015

(86) PCT No.: PCT/KR2015/002405
§ 371 (c)(1),
(2) Date: Nov. 14, 2016

(87) PCT Pub. No.: WO2015/174624
PCT Pub. Date: Nov. 19, 2015

(65) Prior Publication Data
US 2017/0087494 A1    Mar. 30, 2017

(30) Foreign Application Priority Data

May 12, 2014  (KR) .......................... 10-2014-0056728

(51) Int. Cl.
*B01D 47/00*      (2006.01)
*B01D 45/12*      (2006.01)
(Continued)

(52) U.S. Cl.
CPC .............. *B01D 45/12* (2013.01); *A47L 9/165* (2013.01); *A47L 9/1608* (2013.01); *B04C 5/04* (2013.01); *B04C 5/26* (2013.01)

(58) Field of Classification Search
CPC ....... A47L 9/165; A47L 9/1608; B01D 45/12; B04C 5/04; B04C 5/26
See application file for complete search history.

(56) References Cited

U.S. PATENT DOCUMENTS 1,773,073 A  *  8/1930  Beach .................... B01D 45/06
                                                    101/474
1,897,195 A  *  2/1933  Howden .................. B04C 1/00
                                                    209/723
(Continued)

FOREIGN PATENT DOCUMENTS

EP      2044875 A1    4/2009
JP    2006-61897 A    3/2006
(Continued)

OTHER PUBLICATIONS

International Search Report for PCT/KR2015/002405.
European Search Report for EP15793581.8 from European patent office in a counterpart European patent application.

*Primary Examiner* — Dung H Bui
(74) *Attorney, Agent, or Firm* — The PL Law Group, PLLC

(57) ABSTRACT

A compressed air purification apparatus includes a cover, an outer drum configured such that compressed air supplied through the inlet swirls downwards between the cover and the outer drum, a discharge pipe inserted into the insertion port to couple the outer drum to the cover, an inner drum configured such that the downwardly swirling compressed air flows upwards between the outer drum and the inner drum and again swirls downwards between the discharge pipe and the inner drum, a collector drum formed in an integrated manner with the inner drum, and a drain cover configured such that impurities separated from the compressed air are collected therein. The compressed air can separate water, oil and minute foreign substances from (Continued)

compressed air by rotating compressed air two times in a double cyclone.

21 Claims, 11 Drawing Sheets

(51) Int. Cl.
*A47L 9/16* (2006.01)
*B04C 5/04* (2006.01)
*B04C 5/26* (2006.01)

(56) References Cited

U.S. PATENT DOCUMENTS

| | | | |
|---|---|---|---|
| 2,763,336 A * | 9/1956 | Erikson | F04C 15/0053 95/261 |
| 3,885,933 A * | 5/1975 | Putney | B01D 45/12 209/723 |
| 6,074,336 A * | 6/2000 | Purvey | B04B 5/005 494/49 |
| 7,806,950 B2 * | 10/2010 | Han | A47L 9/1633 55/345 |
| 8,512,565 B2 | 8/2013 | Mori et al. | |
| 8,795,401 B2 * | 8/2014 | Gwynn | B01D 45/12 55/283 |
| 8,973,215 B2 * | 3/2015 | Makarov | A47L 9/1633 15/353 |
| 9,308,480 B2 * | 4/2016 | Leiss | B01D 45/08 |
| 2004/0103785 A1 * | 6/2004 | North | A47L 9/1608 95/271 |
| 2007/0214756 A1 | 9/2007 | Lee | |
| 2009/0282791 A1 | 11/2009 | Lang | |
| 2010/0083832 A1 * | 4/2010 | Pondelick | B01D 45/16 95/261 |
| 2011/0192771 A1 * | 8/2011 | Mori | B01D 21/0024 210/95 |

FOREIGN PATENT DOCUMENTS

| | | |
|---|---|---|
| JP | 2006061897 A | 3/2006 |
| KR | 10-2008-0078791 A | 8/2008 |
| KR | 10-0908883 B1 | 7/2009 |

* cited by examiner

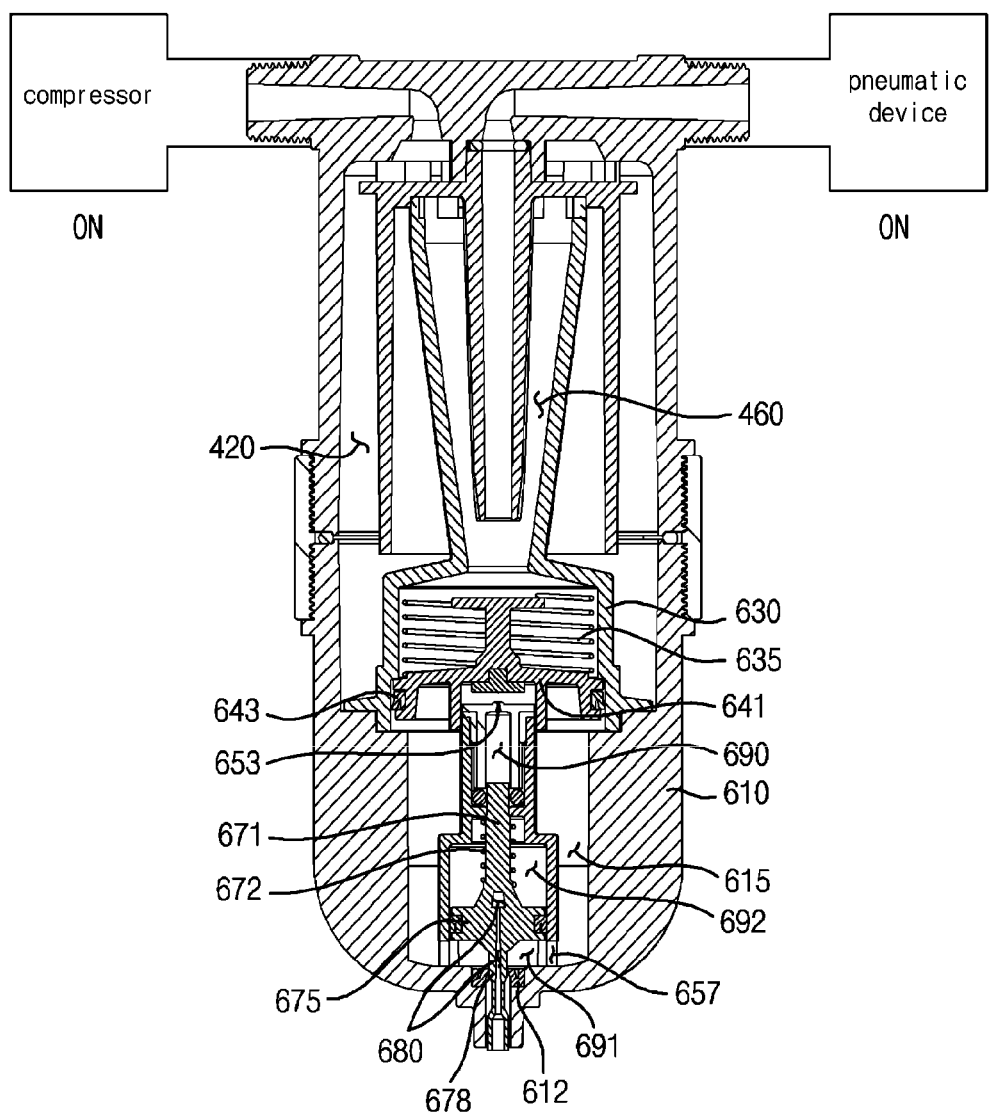

PURIFICATION APPARATUS FOR COMPRESSED AIR

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/002405, filed Mar. 12, 2015, which claims priority to the benefit of Korean Patent Application No. 10-2014-0056728 filed in the Korean Intellectual Property Office on May 12, 2014, the entire contents of which are incorporated herein by reference.

TECHNICAL FIELD

The present invention relates to a purification apparatus for compressed air that can separate water, oil, and minute foreign substances from the compressed air by swirling the compressed air twice in a double cyclone.

BACKGROUND ART

Compressed air is used in various fields of industry including machinery, electronics, medicine, foods, and the like. However, since condensate, particles, and oils can cause problems such as degraded performance, adhesion, and damage in pneumatic devices that utilize compressed air, it is vital that a moisture remover, oil remover, and particle remover also be used.

Here, a pneumatic device can be defined as a device that converts the mechanical energy of a compressor or blower into pneumatic energy, adequately controls this compressed air using a control valve, etc., and supplies it to an actuator, to thereby provide the output in the form of mechanical energy suited to the load demand. Generally, the compressed air is provided by compressing the air of the atmosphere, but since atmospheric air includes various contaminants such as moisture, dust, etc., mixed therein, the process of compressing the air with a compressor may entail the contaminants being compressed together, resulting in an increased level of contamination.

In addition to substances entering together with the air inflow, substances such as lubricant oil, sealant, residue from filter elements, metal particles ground off from friction, and rust particles from corrosion may enter during the process of compressing the air. As such, a device for cleansing the compressed air is needed.

A compressed air purification apparatus for according to the related art, which may be called an "air filter" if it is a regular type and may be called a "mist separator" or a "demister" if it is specialized to removing water, may use a filter element that includes a porous part having minute pores for removing the moisture contained in the compressed air. The principle adopted here is that when the compressed air passes through the filter element, the moisture may be filtered and collected at the minute pores.

Since the conventional filter element is composed of a porous part, made from materials such as fabric, plastic, metal, etc., a "blockage" phenomenon inevitably occurs with the passage of time, due to sediments or microorganisms. Thus, while a filter element may function normally for a certain period of time after it is newly installed, the minute pores may eventually be blocked as time passes. As the blockage progresses, the cross-sectional area available for the air to pass through may decrease, and it may become increasingly difficult for the compressed air to pass through. This would result in increased pressure loss, which in turn would result not only in wasted energy but also in the pressure at the output end being lower that the required pressure. Hence, if the pressure difference between the front end and rear end of the filter element exceeds a certain level, it may be necessary to replace the filter element.

In other words, the filter element is an expendable part that must be replaced regularly, but if the filter housing is not transparent, the filter element may not be visible and determining the degree of blockage may be difficult, so that the appropriate time for replacing the filter element may be overlooked. Moreover, the higher the level of purity required of the compressed air, the smaller the pores must be in the filter element used, whereby the occurrence of such blockage is more significant in filter elements having more finely minute pores. Also, in order to discern the correct time for replacing the filter element, pressure gauges may be installed respectively on the front end and rear end of the compressed air dehumidifier, or a differential pressure gauge may be installed to check the pressure difference, but this would entail increases in equipment costs, installation space, and maintenance costs.

To address these drawbacks of the filter element, a purification apparatus utilizing centrifugation (cyclones) has been proposed.

A centrifuge-type apparatus for purifying compressed air according to the related art can be found in the Patent Document (Korean Patent Application Publication No. 10-2008-0078791).

The centrifuge-type compressed air purification apparatus according the related art may include an exhaust drum installed within the housing and spiral grooves formed in the circumference of the exhaust drum, where contaminants are made to gather at the inner wall of the housing, and cleansed compressed air is made to flow through the center of the housing.

The compressed air supplied through the suction pipe may be met by an obstruction plate, and with the flow thus converted to a rotational state, the compressed air may rotate along the circumferential direction around the vent within a preliminary swirl chamber formed inside the housing, thereby undergoing preliminary centrifugation based on the density difference between gases and liquids.

The compressed air that has passed through the preliminary swirl chamber may maintain a helical flow in a second swirl chamber, which is formed between the inner surface of the housing and the exhaust drum, along the multiple rows of spiral grooves formed in the circumference of the exhaust drum, so that the centrifugal force may apply gas-liquid separation based on density difference. The liquid centrifuged from the compressed air may move through the gap between the inner wall of the housing and the perimeter of the multiple rows of spiral grooves and may adhere to the inner wall of the housing to be later removed.

With the helical flow maintained in the second swirl chamber formed between the inner surface of the housing and the exhaust drum, a strong centrifugal force may be applied for gas-liquid separation based on density difference, with the liquid having a higher density separated from the gas having a lower density. Thus, the purified gas may pass through a vent formed in the lower portion of the exhaust drum and maintain helical flow in a third swirl chamber, so that any remaining liquid component may once more be centrifuged, and may pass along the rotational axis to the exhaust pipe, while the remaining condensate may be discharged at the lower part of the exhaust drum, for increased dehumidifying efficiency.

The gas purified by centrifugation may pass through a vent and through an outlet nipple connected to the exhaust pipe and external gas piping, to be sent to a pneumatic device. The liquid or condensate separated in the second swirl chamber and third swirl chamber may gather in a discharge bath within a discharge drum located at a lower portion of the housing, and may pass through a final discharge opening and through a trap to be discharged to the exterior.

However, as the compressed air moves from the first swirl chamber to the second swirl chamber and third swirl chamber, the flow merely maintains a helical form, and the centrifugal force becomes increasingly weaker. Thus, the separation of moisture and foreign substances from the compressed air may be decreased in efficiency, and it may be difficult to separate minute foreign substances.

SUMMARY

The present invention has been devised to address the problems above, and the present invention is intended to provide a compressed air purification apparatus that can separate moisture as well as minute foreign substances from the compressed air by forming cyclones in a dual form to doubly swirl the compressed air.

In order to achieve the objective above, according to one aspect of the present invention, there is provided a compressed air purification apparatus that includes: a cover, at an upper portion of which an inlet and outlet for the compressed air are formed, and of which the lower portion is open; an outer drum, which is inserted inside the cover, and which moves the compressed air supplied through the inlet to swirl downwards; a discharge pipe formed inside the outer drum and connecting with the outlet; and an inner drum, which is inserted between the outer drum and the discharge pipe, and which moves the downwardly swirling compressed air to flow upwards and again swirl downwards.

Also, the inner drum may decrease in diameter along a downward direction.

Also, a first channel may be formed along the perimeter of an upper surface of the outer drum to allow compressed air to be discharged in a tangential direction, and a second channel may be formed along the perimeter of an upper end of the inner drum to allow compressed air to be supplied in a tangential direction.

Also, a first impurity may be separated from the compressed air between the cover and the outer drum, a second impurity may be separated between the inner drum and the discharge pipe, and a drain member for discharging the first impurity and second impurity may further be included, where the drain member may include a drain cover that connects with the cover to collect the first impurity, a collector drum that connects with the inner drum to collect the second impurity, and a discharge unit that discharges the first impurity and second impurity by way of a pressure difference between the drain cover and the collector drum.

The present invention may provide the following advantageous effects.

A cyclone generator member for generating a double cyclone includes an outer drum, which primarily swirls the compressed air that has entered inside the cover, and an inner drum, which again swirls the compressed air. Thus, when the compressed air passes the outer drum and enters the inner drum, the centrifugal force of the swirl becomes even stronger, so that the efficiency of separating oil and foreign substances is not lowered. Moreover, since there is no filter element used, the initial level of performance can be maintained, allowing semi-permanent use.

Also, since the diameter of the inner drum decreases along the downward direction, the second swirling of the compressed air may be greatly accelerated. As this enables the separation of minute water, oil, and particle components that were not separated during the first swirling, the efficiency of air purification can be maximized.

Also, first channels formed along the perimeter at the upper surface of the outer drum allow the discharge of compressed air in tangential directions, such that the compressed air may be swirled at the exterior of the outer drum, while second channels formed along the perimeter at the upper end of the inner drum allow the inflow of compressed air in tangential directions, such that the compressed air may be swirled at the interior of the inner drum, whereby water, oil, and foreign substances can be readily separated.

A first impurity is gathered at the drain cover, and a second impurity is gathered at the collector drum. The discharge unit discharges the first impurity and second impurity automatically by way of the pressure difference of the collector drum caused by the double cyclone of the cyclone generator member, to allow convenient use.

DESCRIPTION OF DRAWINGS BRIEF DESCRIPTION OF THE DRAWING

FIG. 7c is a cross-sectional view illustrating an operating state of the drain member (compressor ON, pneumatic device ON).

DETAILED DESCRIPTION

Certain embodiments of the present invention are described below with reference to the accompanying drawings.

Figure 1:
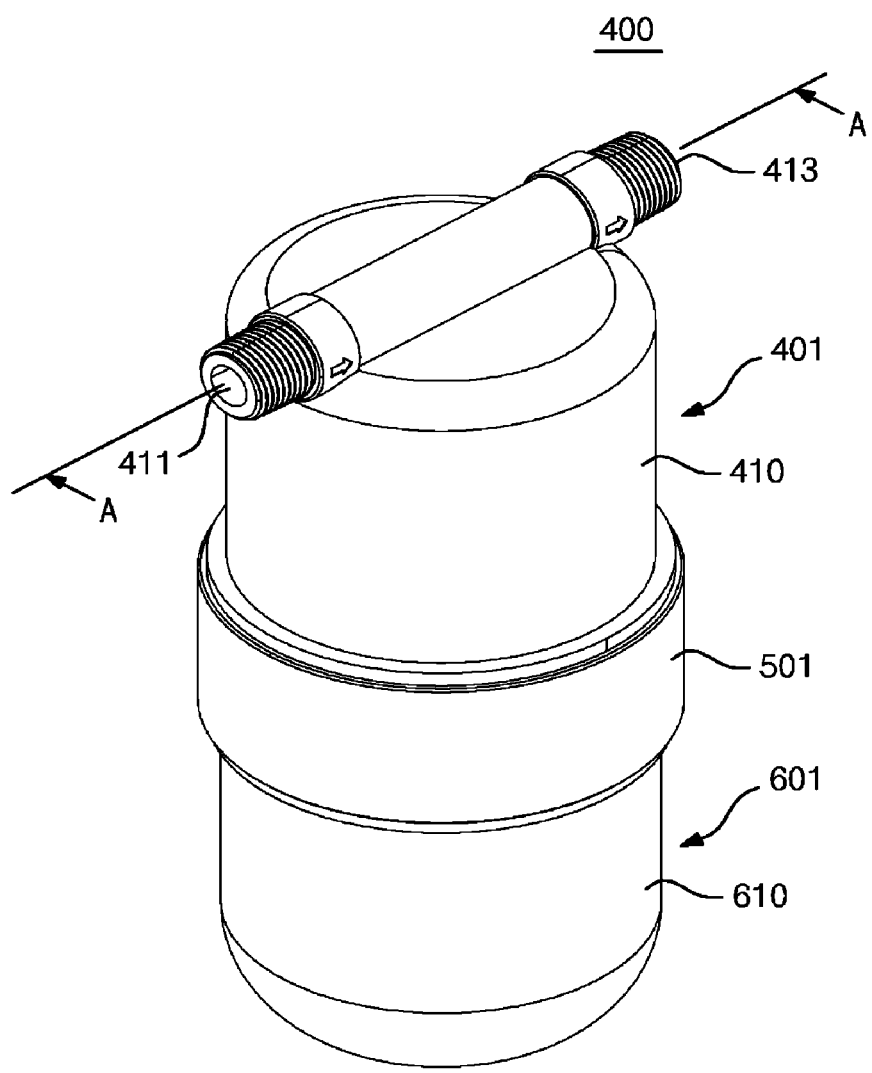
FIG. 1 is a perspective view of a compressed air purification apparatus according to an embodiment of the present invention.
Figure 2:
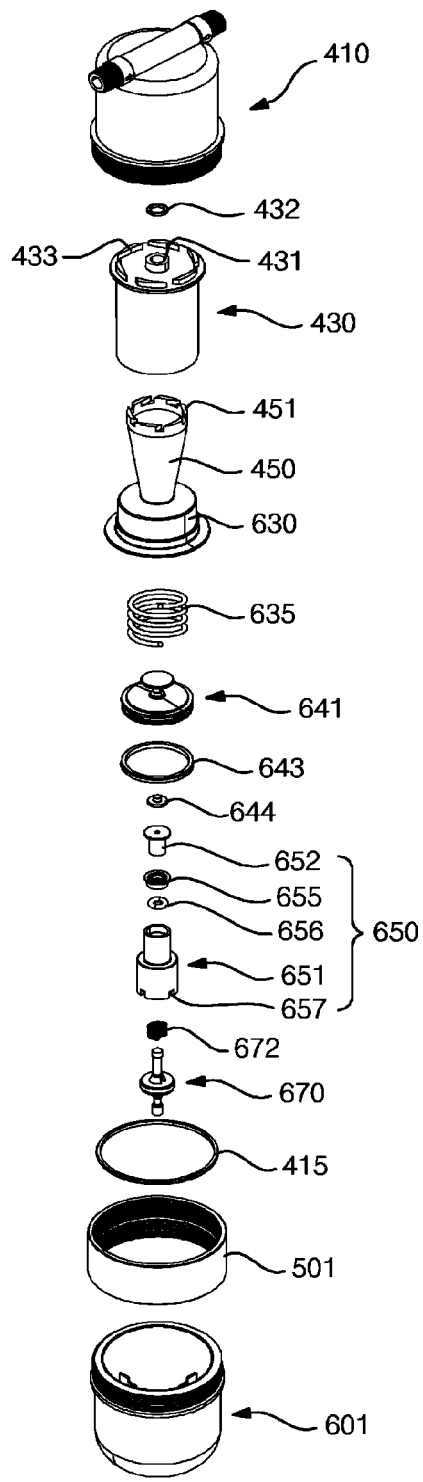
FIG. 2 is an exploded perspective view of FIG. 1.
Figure 3:
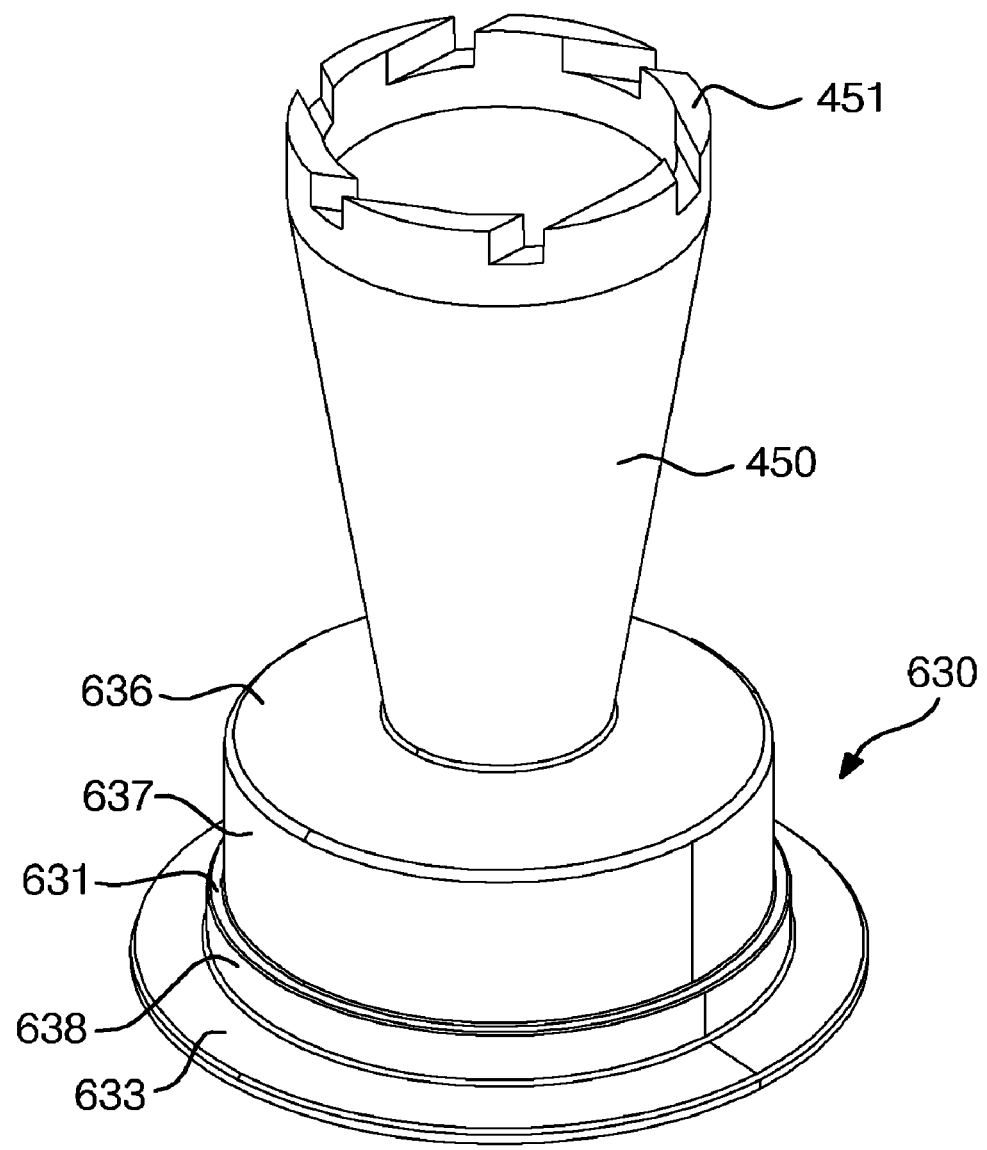
FIG. 3 is a perspective view of the inner drum and the collector drum.
Figure 4:
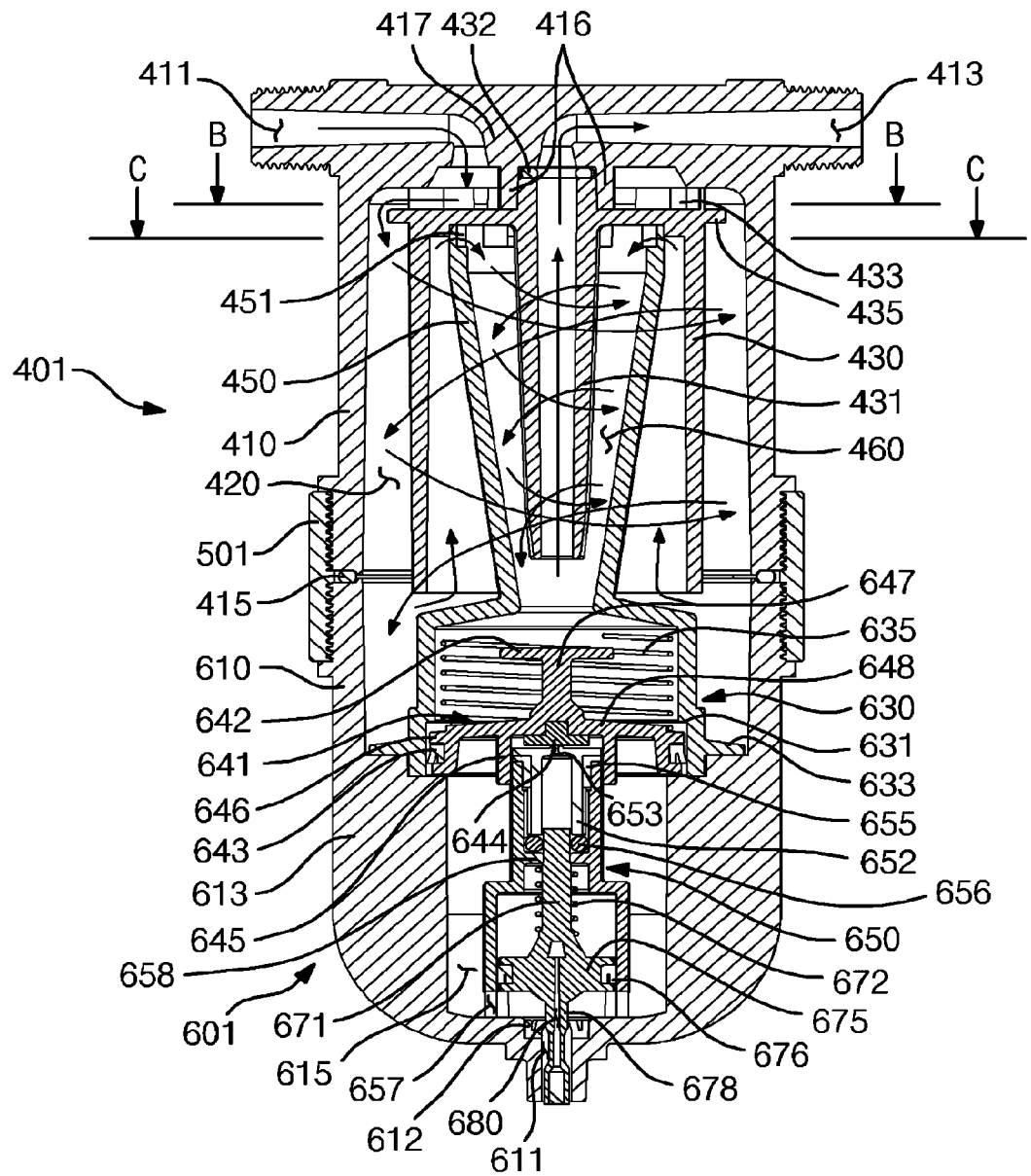
FIG. 4 is a cross-sectional view across A-A of FIG. 1.
Figure 5:
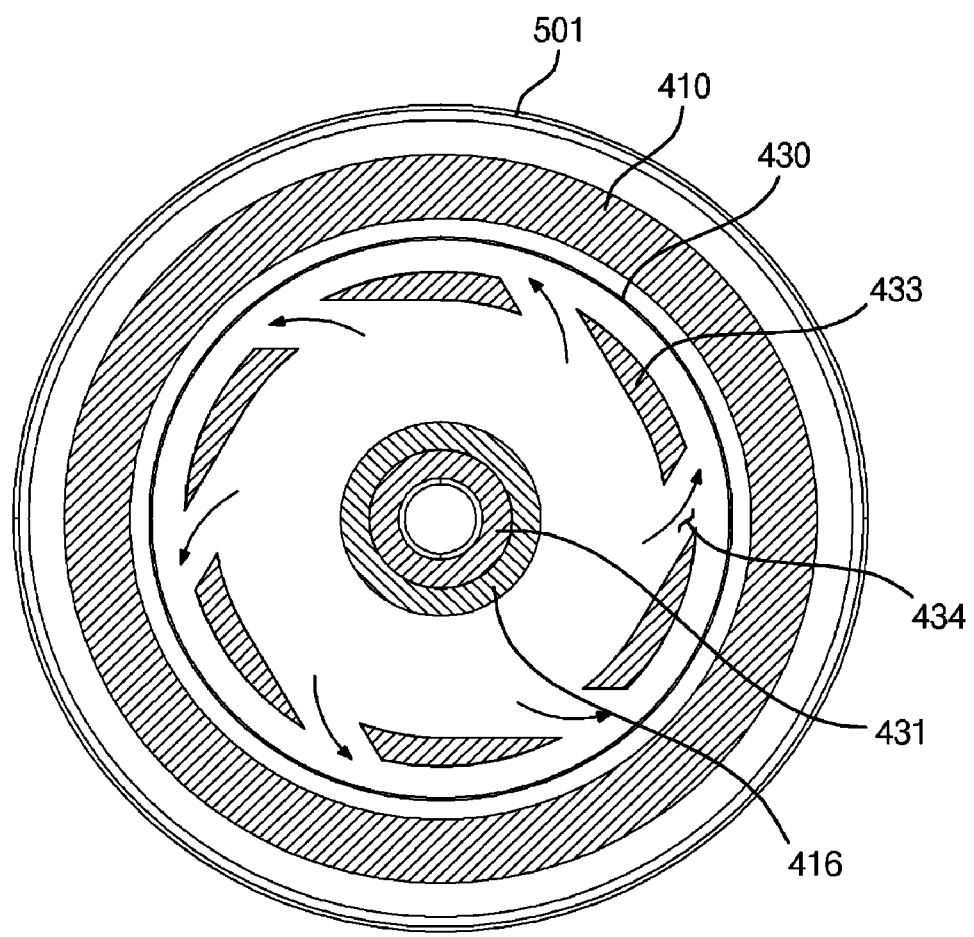
FIG. 5 is a cross-sectional view across B-B of FIG. 4.
Figure 6:
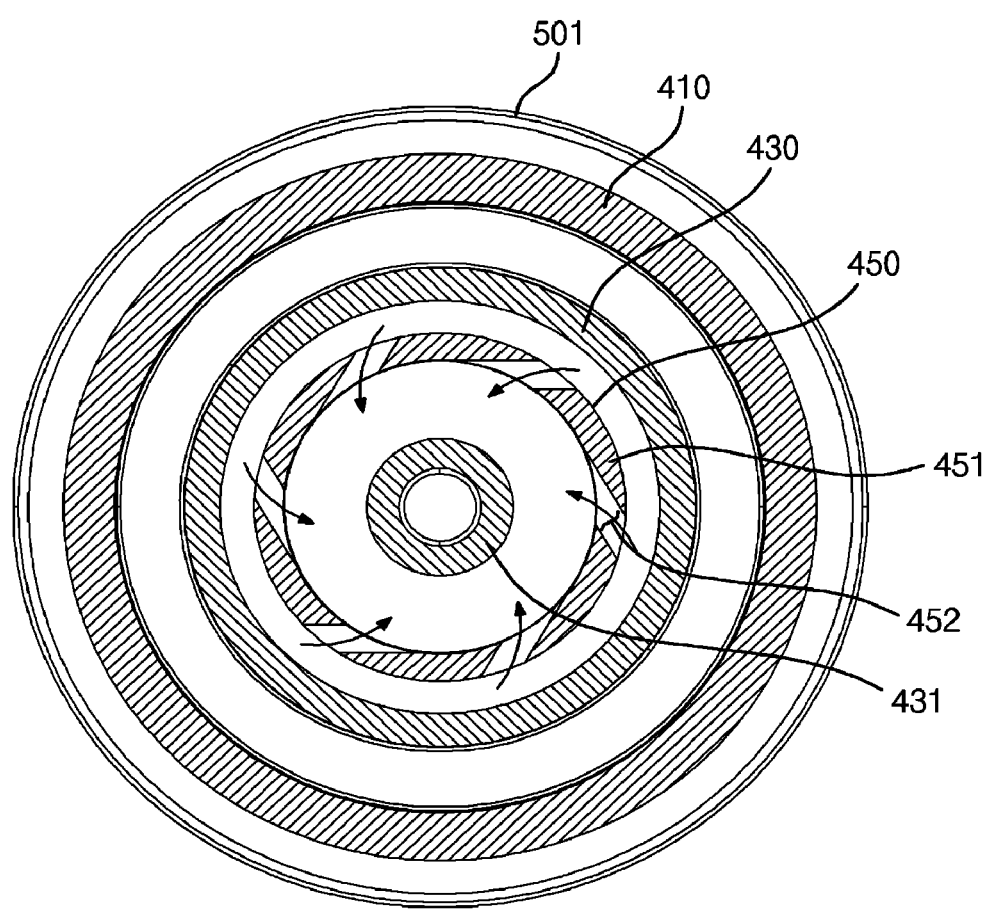
FIG. 6 is a cross-sectional view across C-C of FIG. 4.
Figure 7A:
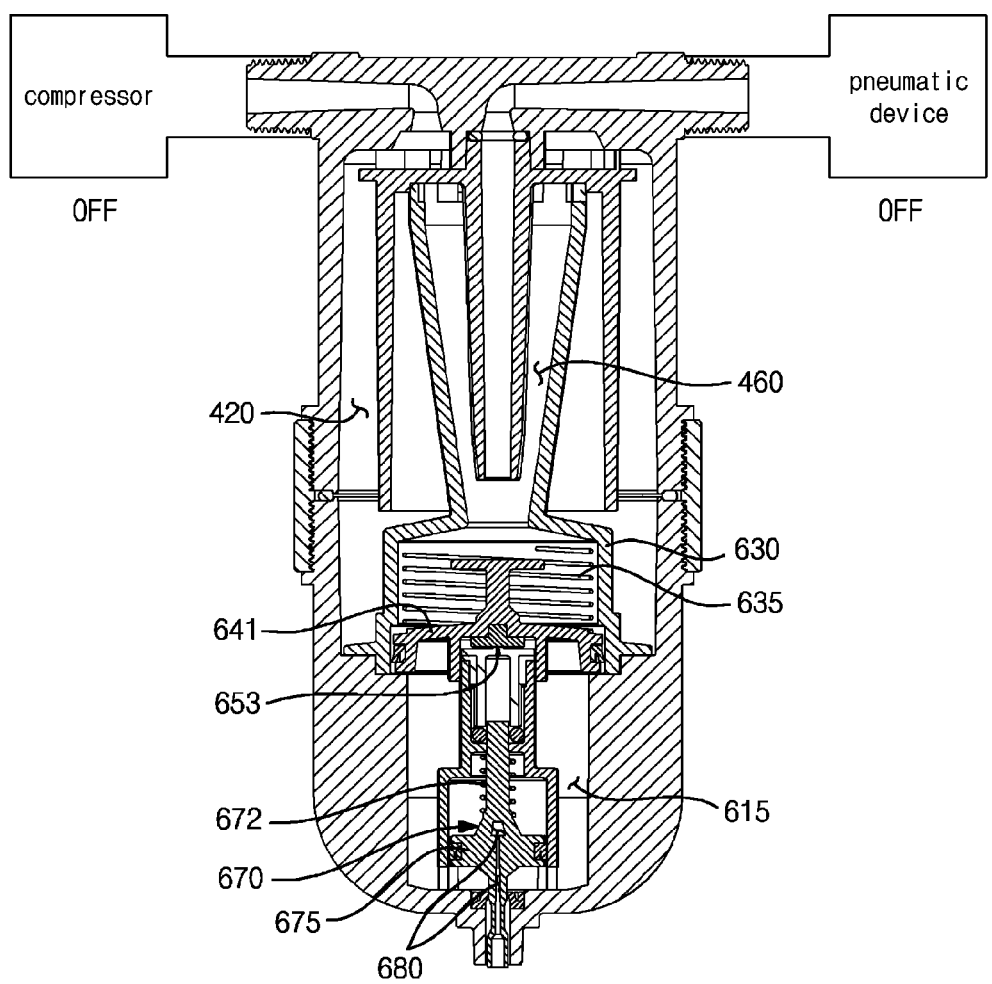
FIG. 7a is a cross-sectional view illustrating an operating state of the drain member (compressor OFF, pneumatic device OFF).
Figure 7B:
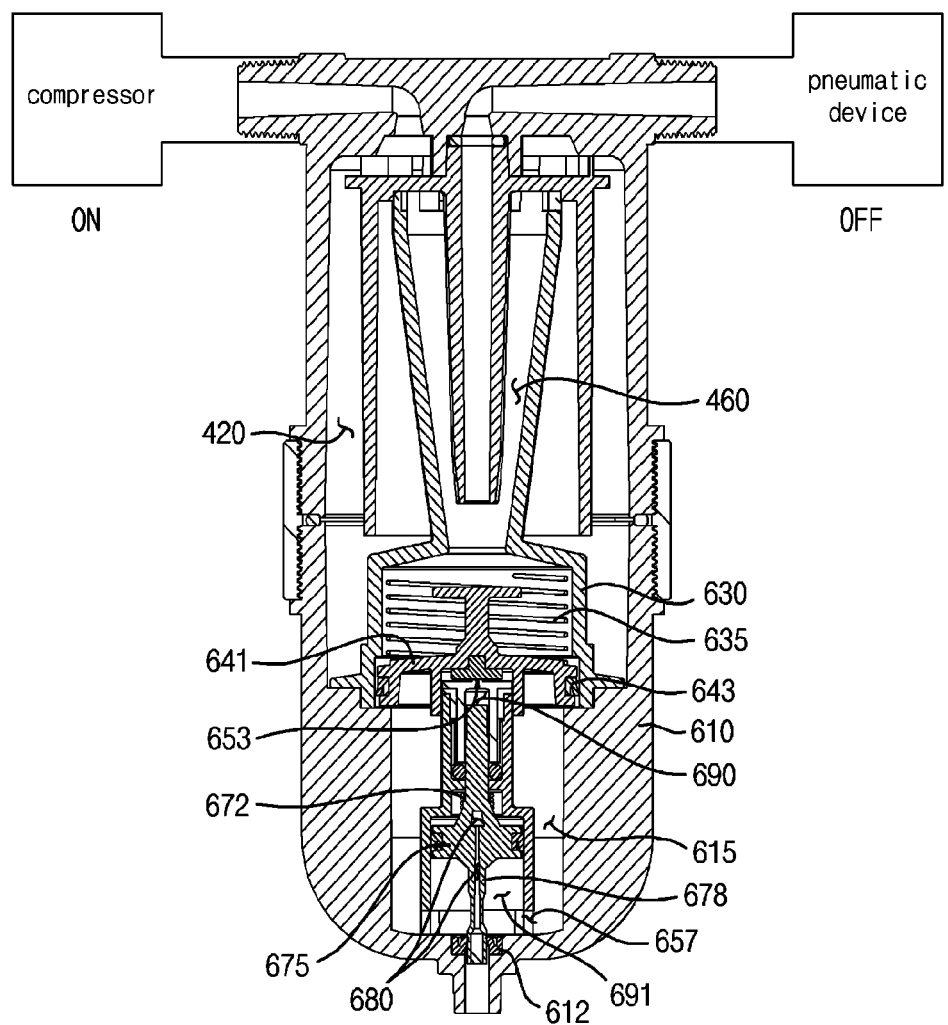
FIG. 7b is a cross-sectional view illustrating an operating state of the drain member (compressor ON, pneumatic device OFF).
Figure 8:
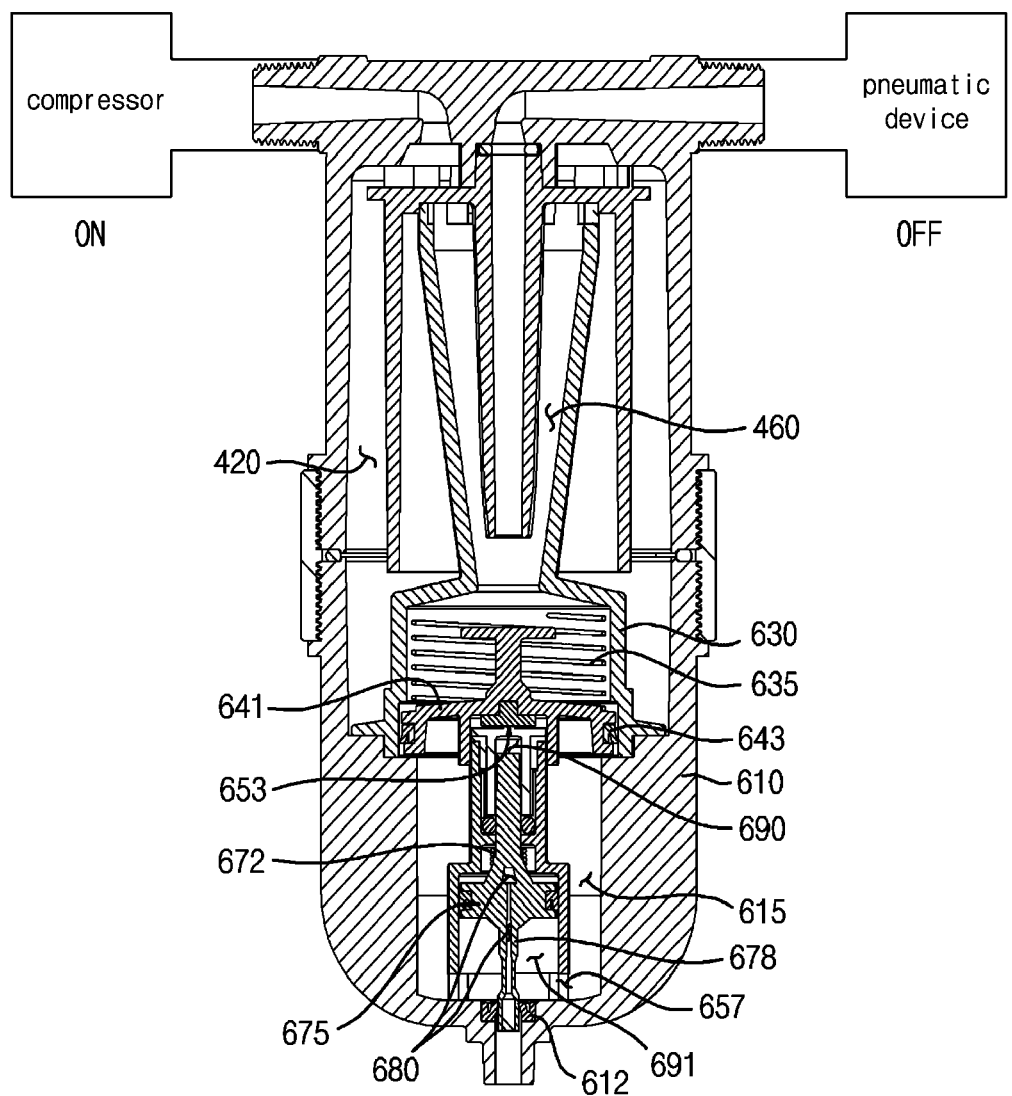
Figure 9:
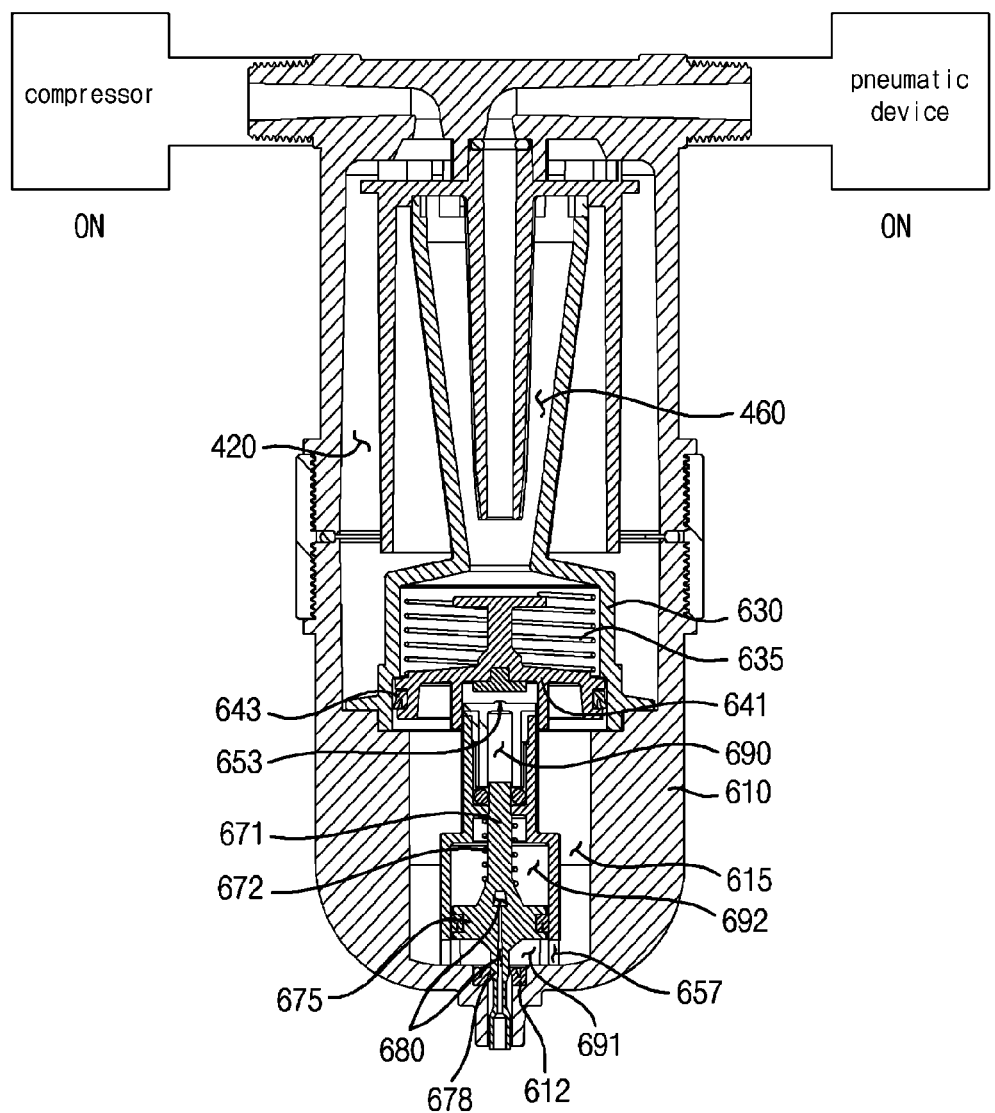

FIG. 1 is a perspective view of a compressed air purification apparatus according to an embodiment of the present invention, FIG. 2 is an exploded perspective view of FIG. 1, FIG. 3 is a perspective view of the inner drum and the collector drum, FIG. 4 is a cross-sectional view across A-A of FIG. 1, FIG. 5 is a cross-sectional view across B-B of FIG. 4, FIG. 6 is a cross-sectional view across C-C of FIG. 4, FIG. 7a is a cross-sectional view illustrating an operating state of the drain member (compressor OFF, pneumatic device OFF), FIG. 7b is a cross-sectional view illustrating an operating state of the drain member (compressor ON, pneumatic device OFF), and FIG. 7c is a cross-sectional view illustrating an operating state of the drain member (compressor ON, pneumatic device ON).

As illustrated in FIGS. 1 to 7c, a compressed air purification apparatus 400 according to an embodiment of the present invention may include a cyclone generator member 401 that generates a double cyclone.

The cyclone generator member 401 may include a cover 410 that has an inlet 411 and outlet 413 for compressed air formed at an upper portion thereof, and the cover has an open lower portion; an outer drum 430 that is inserted inside the cover 410 and is configured to move the compressed air that enters through the inlet 411 to swirl downwards; a discharge pipe 431 formed inside the outer drum 430 and connecting with the outlet 413; and an inner drum 450 inserted between the outer drum 430 and the discharge pipe 431, with the inner drum 450 moving the downwardly swirling compressed air to flow upwards and again swirl downwards.

The space formed between the cover 410 and the outer drum 430 and connecting with the inlet 411 may be designated a first chamber 420, while the space formed between the inner drum 450 and the discharge pipe 431 and connecting with the discharge pipe 431, or the outlet 413, may be designated a second chamber 460.

Also, below the cyclone generator member 401 are a drain member 601, which may discharge impurities separated at the cyclone generator member 401; and a connector ring 501, which may couple the cyclone generator member 401 and the drain member 601.

With respect to the present invention, the purification of compressed air refers to separating impurities, i.e. water, oil, and foreign substances, from the compressed air.

The cover 410 may have a cylindrical shape with an open lower portion.

At an upper surface of the cover 410, a linear pipe may be formed through which the compressed air may enter and exit. At one end of the pipe, an inlet 411 may be formed, through which the compressed air may be supplied, and at the other end of the pipe, an outlet 413 may be formed, through which the compressed air with water, oil, and foreign substances removed may be discharged.

A compressor for compressing air or the like may be connected to the inlet 411, while a pneumatic device may be connected to the outlet 413.

As illustrated in FIG. 4, the compressed air supplied through the inlet 411 may be met by a center plate 417 formed at the center of the pipe to move downward and through the upper surface of the outer drum 430.

At a lower portion of the center plate 417, i.e. at the center of the upper surface on the inside of the cover 410, an insertion port 416 connecting with the outlet 413 may be included in a protruding form.

The insertion port 416 may be formed in a cylindrical shape, with its lower portion open and its upper portion connecting with the outlet 413.

Into the open lower portion of the insertion port 416, the discharge pipe 431 may be inserted to discharge the purified compressed air.

At the upper portion of the discharge pipe 431, an O-packing a 432 shaped as a hollow ring may be coupled for sealing, so as not to allow the compressed air to leak from the upper surface of the outer drum 430 into the discharge pipe 431.

Threads may be formed on the lower portion of the cover 410 and the upper portion of the drain cover 610, for coupling with a connector ring 501. Also, an O-packing b 415 shaped as a hollow ring may be fitted between the lower end of the cover 410 and the upper end of the drain cover 610 for sealing.

Through the lower portion of the cover 410, the outer drum 430 may be inserted inside.

The outer drum 430 may be formed in a cylindrical shape with a lower portion open, as illustrated in FIGS. 2 to 6.

At the center inside the outer drum 430, a discharge pipe 431 may be formed, protruding through the upper surface of the outer drum 430. As the upper portion of the discharge pipe 431 is inserted into the insertion port 416, the outer drum 430 may be coupled to the cover 410.

The discharge pipe 431 may be formed in a cylindrical shape and may connect with the outlet 413.

Also, at an upper portion of the sidewall of the outer drum 430, a first flange 435 may be formed to protrude outwards.

The first flange 435 may allow a certain amount of water and oil contained in the compressed air to condense before moving downwards.

At the upper surface of the outer drum 430, first channels 434 may be formed along the perimeter of the upper surface to allow the compressed air to be discharged in tangential directions.

That is, as illustrated in FIG. 5, the first channels 434 may be formed in-between the vane-shaped first flow guide vanes 433. Thus, the compressed air supplied through the upper surface of the outer drum 430 may be made to swirl.

The first flow guide vanes 433 may be arranged in equal intervals along the perimeter of the upper surface of the outer drum 430, as illustrated in FIGS. 2 and 5. Thus, the compressed air may move through the first channels 434 formed in-between the first flow guide vanes 433 to be discharged along the perimeter of the upper surface of the outer drum 430 in tangential directions.

Also, as illustrated in FIG. 5, each of the first flow guide vanes 433 may be formed such that its width decreases along the counter-clockwise direction. Thus, as represented by the arrows in FIG. 5, the compressed air may be discharged through the first channels 434 formed in-between the separate first flow guide vanes 433 and into the first chamber 420, i.e. the space between the outer drum 430 and the cover 410.

Because of the first channels 434, the compressed air may be discharged into the space between the outer drum 430 and the cover 410 while swirling, and may flow downwards while in a swirling state.

The flow and the purification process of the compressed air will be described later on in further detail.

The inner drum 450 may be inserted between the outer drum 430 and the discharge pipe 431.

The inner drum 450, as illustrated in FIGS. 2 to 6, may be formed in a cylindrical shape and may be inserted through the lower part of the outer drum 430 to be disposed between the outer drum 430 and the discharge pipe 431.

At the upper end of the inner drum 450, second channels 452 may be formed along the perimeter of the upper end to allow the compressed air to enter in tangential directions.

That is, as illustrated in FIG. 6, the second channels 452 may be formed in-between the vane-shaped second flow guide vanes 451. Thus, the compressed air may again be made to swirl.

The second flow guide vanes 451 may be arranged in equal intervals along the perimeter of the upper end of the inner drum 450, as illustrated in FIGS. 3 and 6. Thus, the compressed air may move through the second channels 452 to be supplied along the perimeter of the upper end of the inner drum 450 in tangential directions.

Also, as illustrated in FIG. 6, each of the second flow guide vanes 451 may be formed such that its width decreases along the clockwise direction. Thus, as represented by the arrows in FIG. 6, the compressed air may be supplied through the second channels 452 formed in-between the separate second flow guide vanes 451 and into the second chamber 460, i.e. the space between the inner drum 450 and the discharge pipe 431.

That is, because of the second channels 452, the compressed air may be supplied into the space between the inner drum 450 and the discharge pipe 431 while swirling a second time, and may flow downwards while in a swirling state.

As the compressed air is swirled twice through the first channels 434 and the second channels 452, the separation of water, oil, and foreign substances can be readily achieved.

The diameter of the inner drum 450 may decrease from the top towards the bottom.

That is, as the compressed air moves further down, the gap between the inner drum 450 and the discharge pipe 431 may become increasingly narrow, and as the cross-sectional area over which the compressed air may pass becomes smaller, the swirling speed of and the centrifugal force applied on the compressed air between the inner drum 450 and the discharge pipe 431 may increase.

The sum of the cross-sectional areas of the first channels 434 formed in-between the first flow guide vanes 433 through which the compressed air passes may be greater than the sum of the cross-sectional areas of the second channels 452 formed in-between the second flow guide vanes 451. Also, the sum of the cross-sectional areas of the second channels 452 may be greater than the cross-sectional area of the inlet 411, but in order to accelerate the compressed air, may be formed in a size similar to the cross-sectional area of the inlet 411. The sum of the cross-sectional areas of the first channels 434 may be made 1.5 times greater than the minimum cross-sectional area of the inlet 411. This can prevent loss of flow rate.

The flow and the purification process of the compressed air within the cyclone generator member 401 are described below with reference to FIGS. 4 to 6.

As information on the compressor connected to the inlet 411 and the pneumatic device connected to the outlet 413 have been published in prior art, including the related art discussed above, these are not described here in excessive detail.

Below, a description is provided on the process by which water, oil, and foreign substances are separated from the compressed air, when the compressor and the pneumatic device are operated so that the compressed air is supplied through the inlet 411 and discharged through the outlet 413, and a flow is created within the cyclone generator member 401.

As represented by the arrows in FIG. 4, the compressed air supplied through the inlet 411 may be bent in a right angle downward, due to the center plate 417, to be supplied to the upper surface of the outer drum 430. Then, it may again be bent in a right angle to be moved in the outward direction of the outer drum 430. Here, the compressed air may pass through the first channels 434 in-between the first flow guide vanes 433 and form a swirl, as represented by the arrows in FIG. 5.

Afterwards, the compressed air may flow downwards while swirling within the first chamber 420, i.e. between the cover 410 and the outer drum 430. Here, water, oil, and foreign substances may be separated from the compressed air by the centrifugal force to be pushed to the inner wall of the cover 410, and may subsequently move downwards along the inner wall of the cover 410 and the inner wall of the drain cover 610 to be gathered in the lower part of drain cover 610, i.e. the lower collector space 615.

The actual separation of water, oil, and foreign substances from the compressed air by way of the first swirling may occur in the lower space of the first chamber 420, i.e. between the cover 410 and the outer drum 430. If the length of the space in which the first swirling occurs is too short, the separation may not be adequately achieved due to an insufficient amount of centrifugal force applied; likewise, if the length of the space is too long, the separation performance may be degraded due to the speed of the compressed air being reduced by friction with the wall surface. As such, the cover 410 and the outer drum 430 may be formed in consideration of the above.

The water, oil, and foreign substances separated between the cover 410 and the outer drum 430 are referred to herein as a first impurity.

The first impurity separated as above during the first swirling of the compressed air may include a large amount of condensation, collected in the form of water droplets or streams containing oil components and foreign substances.

Although the first swirling is performed at a lower speed compared to the second swirling, the first swirling may process a larger flow amount, so that relatively larger droplets of water, oil, and foreign substances may be separated.

The compressed air, which has flowed downwards in the first chamber 420, i.e. between the cover 410 and the outer drum 430, and from which the first impurity has been separated, may then be supplied to the space between the outer drum 430 and the inner drum 450. Thus, it may flow upwards up to the second channels 452 at the upper end of the inner drum 450.

As represented by the arrows in FIG. 6, the compressed air may pass through the second channels 452 in-between the second flow guide vanes 451, to be swirled once again, i.e. undergo a second swirling.

That is, the compressed air may pass through the second channels 452 into the second chamber 460, i.e. the space between the inner drum 450 and the discharge pipe 431.

Thus, as illustrated in FIG. 4, the compressed air may be quickly swirled within the space between the inner drum 450 and the discharge pipe 431, so that minute water, oil, and foreign substance components may be separated.

The water, oil, and foreign substances separated between the inner drum 450 and the discharge pipe 431 are referred to herein as a second impurity.

The separated second impurity may move downwards and may gather in a collector drum 630.

Since the second channels 452 have smaller cross-sectional areas than those of the first channels 434, and since the circle formed by the second flow guide vanes 451 has a smaller diameter than that of the circle formed by the first flow guide vanes 433, the second swirling applied on the compressed air may be accelerated to much faster speeds compared to the first swirling.

Also, as the inner drum 450 is given a gradient such that the diameter is gradually decreased towards a downward direction, the swirling speed of the compressed air may be made faster and faster as it moves towards the lower portion of the inner drum 450.

As described above, the second swirling of the compressed air may be further accelerated as it moves closer to the bottom in the second chamber 460, i.e. the space between the inner drum 450 and the discharge pipe 431, resulting in a high-speed swirl.

Thus, as the centrifugal force generated is considerably greater than the first swirling, it can separate minute water components, oil components, and particles that could not be separated during the first swirling, thereby providing improved air purification efficiency.

The minute water components or particles, etc., separated in the second chamber 460 may be pushed to the inner wall of the inner drum 450, and may move down along the inner wall to be collected in a collector drum 630 formed at a lower part of the inner drum 450.

The compressed air from which the second impurity has been separated may be supplied to the lower portion of the discharge pipe 431 and quickly discharged through the outlet 413.

If the sum of the cross-sectional areas of the first channels 434, through which the compressed air passes, is formed in a size similar to the cross-sectional area of the inlet, not only is there a risk of foreign substances such as oil components adhering to and blocking the first channels 434, but also a loss of flow rate may occur in the inner drum 450 where the second swirling is formed. Thus, the first swirling may be performed in a wider space as a lower speed swirl to separate larger clumps of water and foreign substances, whereas the second swirling may be performed in a narrower space as a higher speed swirl to separate minute water and foreign substances.

As described above, a double cyclone system is adopted, in which a first swirling is achieved with the outer drum 430 and a second swirling is achieved with the inner drum 450. As such, when the compressed air passes through the outer drum 430 and enters the inner drum 450, the centrifugal force of the swirling is made even stronger, and there is no decrease in efficiency as regards separating oil components and foreign substances.

Moreover, since the second swirling of the compressed air is achieved with a greater speed than that of the first swirling, it is possible to separate even minute water, oil, and particle components that were not separated during the first swirling, whereby the efficiency of the air purification can be maximized.

Also, since there is no filter element used, the initial level of performance can be maintained, allowing semi-permanent use.

When separating the first impurity and second impurity from the compressed air by way of a low-speed first swirling and a high-speed second swirling, i.e. by generating a double cyclone, as described above, a pressure gradient may be formed within the cyclone generator member 401.

To be more specific, a high pressure region may be formed in the space from the first channel 434 to the second channel 452, i.e. the space between the cover 410 and the outer drum 430 and the space between the outer drum 430 and the inner drum 450. On the contrary, the pressure inside the inner drum 450, i.e. the space between the inner drum 450 and the discharge pipe 431, may greatly decrease and form a low pressure region.

Thus, the drain member 601 coupled to a lower portion of the cyclone generator member 401 may automatically discharge the first impurity and second impurity by using the pressure difference of the first chamber 420 and second chamber 460.

The process by which the first impurity and second impurity are discharged automatically due to pressure difference is described below in further detail.

The drain member 601 may include a drain cover 610, which has a discharge port 611 formed in a lower portion, and which is coupled to a lower portion of the cover 410 such that the first impurity may be gathered therein; a collector drum 630, which is formed in a cylindrical shape at a lower portion of the inner drum 450 such that the second impurity may be gathered therein; and a discharge unit, which is inserted into the collector drum 630 to discharge the first impurity and second impurity using the pressure difference of the drain cover 610 and the collector drum 630.

The drain cover 610 may be formed as a cup-shaped cylinder with its upper portion open.

The drain cover 610 may be coupled to a lower portion of the cover 410 by way of a connector ring 501.

At a lower portion on the inside of the drain cover 610, supports 613 shaped as panels may be formed protruding inward. The supports 613 may be arranged in equal intervals along the perimeter of the inner wall of the drain cover 610, four in number.

Thus, the collector drum 630 is placed on the upper ends of the supports 613 and the supports 613 may support the collector drum 630.

Also, the supports 613 may suppress the movement of impurities collected in the lower collector space 615 so that the impurities can be effectively discharged.

Also, in a lower portion of the drain cover 610, i.e. below the supports 613, a discharge port 611 may be formed to discharge the first impurity and second impurity to the exterior of the drain cover 610.

The discharge port 611 may have a cylindrical shape in a protruding form.

The first impurity produced in the first chamber 420, i.e. between the cover 410 and the outer drum 430, may move downward and gather in the lower collector space 615 at a lower portion inside the drain cover 610. As the first chamber 420 spatially connects with the drain cover 610, the pressure formed in the drain cover 610 may be similar to the pressure in the first chamber 420.

At a lower portion of the inner drum 450, a collector drum 630 may be formed which has a larger diameter than that of the inner drum 450. The collector drum 630 may be disposed at an upper portion on the inside of the drain cover 610.

The collector drum 630 may have a generally cylindrical shape and may be formed under the inner drum 450 integrated with the inner drum 450.

The collector drum 630, as illustrated in FIGS. 3 and 4, may include an inclined surface 636 that has a downward inclination and is connected to a lower portion of the inner drum 450, a first sidewall 637 that is formed vertically downward from the outer perimeter of the inclined surface 636, a curb portion 631 that is curbed outward from a lower portion of the first sidewall 637, a second sidewall 638 that is formed vertically downward from the outer perimeter of the curb portion 631, and a second flange 633 that protrudes from the perimeter of the second sidewall 638.

The second sidewall 638 and the second flange 633 may be placed on the upper ends of the supports 613.

The outer diameter of the second flange 633 may be formed smaller than the inner diameter of the drain cover 610, so that the first impurity may move downwards through the space between the drain cover 610 and the second flange 633 into the lower collector space 615. In other words, the first chamber 420 spatially connects with the lower collector space 615.

The second flange 633 also prevents the swirling of the compressed air between the cover 410 and the outer drum 430 from losing its rotational force due to the supports 613.

Also, a lower portion on the inside of the curb portion 631 may meet the curb of the pressure cut-off part 641 as it rises, thus preventing the pressure cut-off part 641 from rising any further.

Inside the collector drum 630, an elastic body a 635 may be provided and disposed over the pressure cut-off part 641. The elastic body a 635 may include an elastic spring.

The elastic body a 635 may apply a downward force on the pressure cut-off part 641.

An upper portion of the collector drum 630 may be open and may connect with the second chamber 460. Thus, the second impurity produced in the second chamber 460, i.e. between the inner drum 450 and the discharge pipe 431, may move downwards and gather in the collector drum 630.

As the second chamber 460 and the collector drum 630 are spatially connected, the pressure inside the collector drum 630 may be similar to that the pressure inside the second chamber 460.

A discharge unit may be inserted into the open lower portion of the collector drum 630.

The discharge unit, as illustrated in FIGS. 2 and 4, may include a discharge part 650, in which a hole 635 is formed for connecting to the first chamber 420, i.e. the interior of the drain cover 610; a pressure cut-off part 641, which is inserted in the collector drum 630 to open and close the hole 653 according to the pressure difference between the drain cover 610 and the collector drum 630; and a discharge pin 670, which opens and closes the discharge port 611 according to the opening and closing of the hole 653.

The pressure cut-off part 641 may include a circular plate 642 formed at the top, a stem 647 formed at a lower portion of the circular plate 642, and a lower cylinder 648 formed in a flat cylindrical shape at a lower portion of the stem 647.

The circular plate 642 and the stem 647 may be inserted within the elastic body a 635, and the elastic body a 635 may be placed over the lower cylinder 648.

A curb 646 may be formed on the outer perimeter of an upper portion of the lower cylinder 648. Thus, when the pressure cut-off part 641 moves upwards, the curb 646 may contact the curb portion 631 of the collector drum 630 and halt the rising of the pressure cut-off part 641.

At the outer perimeter of the lower cylinder 648, a U-packing a 643 may be coupled to be placed in close contact with the inner wall of the collector drum 630. Thus, the lower part of the collector drum 630 may be sealed, and the spatial connection between the collector drum 630 and the drain cover 610, i.e. the lower collector space 615, may be blocked.

The U-packing a 643 may be disposed with the open portion facing downward, as illustrated in FIG. 4. Thus, when the pressure cut-off part 641 moves downwards, the second impurity in the collector drum 630 may be moved to the lower collector space 615.

That is, when the pressure cut-off part 641 moves down, the U-packing a 643 may be opened to allow the second impurity to flow from the collector drum 630 towards the lower collector space 615.

Such unidirectional opening and closing of the U-packing a 643 mentioned above is described below in further detail.

At a lower portion of the center of the lower cylinder 648, an insertion drum 645 may be formed into which the discharge part 650 may be inserted.

The insertion drum 645 may be formed in a cylindrical shape, and through the open lower portion, an upper portion of the discharge part 650 may be inserted.

At an upper portion on the inside of the insertion drum 645, a hole packing 644 shaped as an inverted "T" may be coupled. The hole packing 644 may preferably be made of a rubber material.

Thus, as the pressure cut-off part 641 moves upward and downward, the hole packing 644 may open and close the hole 653 of the discharge part 650.

With respect to the pressure cut-off part 641, i.e. the lower cylinder 648, the space below connects with the first chamber 420, while the space above connects with the second chamber 460. Thus, it can move up and down within the collector drum 630 to open and close the hole 653, due to the pressure difference between the first chamber 420 and second chamber 460 and upward airflow.

The inner diameter of the insertion drum 645 may be formed greater than the outer diameter of the discharge part 650, i.e. the discharge part body 651.

The discharge part body 651, which defines the outer appearance of the discharge part 650, may have a cylindrical shape and may have a curb formed in the middle. Thus, the upper part of the discharge part body 651 may have a smaller diameter than that of the lower part.

A coupling slot (not shown) may be formed at a lower portion of the discharge part body 651, and this may be fit onto and secured with a protrusion (not shown) formed on a lower portion of the lower collector space 615, i.e. on a lower surface on the inside of the drain cover 610.

Along the perimeter of the lower end of the discharge part body 651, discharge slots 657 may be formed in intervals. In this embodiment, four such slots are formed in equal intervals.

Through the discharge slots 657, the lower portion inside the discharge part body 651 may connect with the drain cover 610, i.e. the lower collector space 615.

The first impurity and second impurity gathered in the lower collector space 615 may enter the inside of the discharge part body 651 via the discharge slots 657, and may be discharged to the exterior of the drain cover 610 via the discharge port 611.

Also, a third protrusion 658 may be formed along the perimeter of the inner wall at an upper portion of the discharge part body 651.

On an upper portion of the third protrusion 658, an O-packing c 656 shaped as a hollow ring may be disposed.

Also, on an upper portion of the O-packing c 656, a cap 652 having a H-shaped cross section may be disposed.

The cap 652 may be inserted in the open upper part of the discharge part body 651, with a cap packing 655 disposed between the top end of the discharge part body 651 and the cap 652 for sealing.

A circular hole 653 may be formed in the center of an upper portion of the cap 652.

Since the inner diameter of the insertion drum 645 is greater than the outer diameter of the discharge part 650, i.e. the discharge part body 651, when the hole 653 is opened, the compressed air of the lower collector space 615 may be supplied into the discharge part 650 through the hole 653.

That is, by way of the hole 653, the upper portion of the inside of the discharge part body 651 may spatially connect with the drain cover 610, i.e. the lower collector space 615.

The change in pressure inside the discharge part 650 resulting from opening or closing the hole 653 and the operation of the discharge pin 670 are described below in further detail.

The discharge pin 670 may be disposed within the discharge part 650, i.e. the discharge part body 651, to slide up and down.

The discharge pin 670 may include a disk 675 that is placed in close contact with the discharge part 650, i.e. the inner perimeter of the discharge part body 651, to block the spatial connection between the upper and lower parts of the discharge part body 651; an upper pin 671 that is formed on an upper portion of the disk 675 with a diameter smaller than that of the disk 675 and is equipped with an elastic body b 672; and a lower pin 678 that is formed on a lower portion of the disk 675 with a diameter smaller than that of the disk 675 to open and close the discharge port 611.

The disk 675 may be positioned at the center of the discharge pin 670 and may be formed in a circular shape.

A U-packing b 676 may be coupled onto the outer perimeter of the disk 675. The U-packing b 676 may be disposed with the open portion facing downwards.

The U-packing b 676 may be placed in close contact with the inner perimeter, i.e. inner wall, of the discharge part body 651, to block the spatial connection between the upper and lower parts of the discharge part body 651 with respect to the disk 675.

The upper pin 671 may be formed on an upper portion of the disk 675.

The upper pin 671 may be formed in the shape of a circular rod. The upper pin 671 may be formed such that the diameter at a center portion is smaller than the diameters of the upper and lower portions.

Also, at the lower portion of the upper pin 671, the diameter may gradually increase along a downward direction.

An elastic body b 672 may be disposed on the outside of the center portion of the upper pin 671. The elastic body b 672 may preferably be formed as an elastic spring.

The elastic body b 672 may be formed with a diameter that allows insertion onto the upper pin 671. When the discharge pin 670 moves upward, the elastic body b 672 may be compressed between the third protrusion 658 and the lower part of the upper pin 671.

At a lower portion of the disk 675, a lower pin 678 may be formed in the shape of a circular rod.

The lower pin 678 may also be formed such that the diameter at a center portion is smaller than the diameters of the upper and lower portions.

Thus, whereas the upper and lower portions of the lower pin 678 may be in close contact with the U-packing c 612 coupled to the discharge port 611, the center portion having a smaller diameter may not be in close contact with the U-packing c 612.

That is, if the center portion of the lower pin 678 having a smaller diameter is positioned in-between the U-packing c 612, the seal of the discharge port 611 may be disengaged. In this way, the first impurity and second impurity may be discharged through the discharge port 611.

An airway 680 may be formed in the discharge pin 670 forming a penetration.

The airway 680 may penetrate through a lower portion of the upper pin 671 in a trapezoidal shape along a lateral direction, and may also penetrate through the disk 675 and the lower pin 678 along a vertical direction to connect with the exterior of the drain cover 610.

Thus, the air under atmospheric pressure outside the drain cover 610 may enter through the airway 680 into an upper part of the inside of the discharge part 650.

A description is provided below, with reference to FIGS. 7a to 7c, on the process by which the first impurity and second impurity gathered in the lower collector space 615 and collector drum 630 may be discharged using the pressure difference between the first chamber 420 and the second chamber 460.

In the following descriptions, the part inside the discharge part 650, i.e. inside the discharge part body 651, above the upper pin 671 will be referred to as the upper space 690, the part outside from the sides of the upper pin 671 and above the disk 675 will be referred to as the center space 692, and the part below the disk 675 will be referred to as the lower space 691.

Also, in this embodiment, the relationships of the magnitudes of pressure are: high pressure >low pressure >atmospheric pressure.

A compressor may be connected to the inlet 411, while a pneumatic device may be connected to the outlet 413.

As illustrated in FIG. 7a, if both the compressor and the pneumatic device are both in an OFF state, then the pressure cut-off part 641 and the discharge pin 670 may both be in a lowered state due to the elastic forces applied by the elastic body a 635 and the elastic body b 672.

As illustrated in FIG. 7b, if the compressor is in an ON state and the pneumatic device is in an OFF state, then there may be compressed air entering through the inlet 411 but no air discharged through the outlet 413, so that there may be no internal flow. As such, the interior of the cyclone generator member 401, i.e. the first chamber 420 and the second chamber 460, may be put in a high-pressure state.

Also, the inside of the drain cover 610 which is spatially connected with the first chamber 420, i.e. the lower collector space 615, may also be put in a high-pressure state, and the inside of the collector drum 630 that is spatially connected with the second chamber 460 may also be put in a high-pressure state. Thus, since high pressure is formed both above and below the pressure cut-off part 641 and there is no large pressure difference, the pressure cut-off part 641 may maintain a lowered state due to the downward force of the elastic body a 635, so that the hole 653 may remain closed.

However, air outside the drain cover 610 that is under atmospheric pressure may enter through the airway 680 into the upper space 690 and center space 692 above the disk 675.

As a result, whereas the lower space 691 below the disk 675 that is connected with the lower collector space 615 may be in a high-pressure state, the upper space 690 and center space 692 above the disk 675 may be in an atmospheric-pressure state, so that a large pressure difference may occur with respect to the disk 675. Thus, as illustrated in FIG. 7b, the discharge pin 670 may overcome the tensional force of the elastic body b 672 and move upward.

When the center portion of the lower pin 678, of which the diameter is smaller than those of the upper and lower portions of the lower pin 678, passes through the U-packing c 612, the first impurity and second impurity collected in the lower collector space 615 may be discharged through the discharge port 611.

That is, as the discharge pin 670 rises and falls, the first impurity and second impurity may be discharged through the discharge port 611.

Next, as illustrated in FIG. 7c, if the compressor is in an ON state and the pneumatic device is in an ON state, then internal flow may be generated as the compressed air enters through the inlet 411 and exits through the outlet 413.

That is, as described above, a first swirl and a second swirl may be generated, whereby the first impurity and second impurity may be separated from the compressed air, with the first impurity moving down and gathering in the lower collector space 615 and the second impurity moving down and gathering in the collector drum 630.

Here, a pressure gradient may be formed within the cyclone generator member 401. Specifically, the inside of the drain cover 610 that is spatially connected with the first chamber 420, i.e. the lower collector space 615, may be put in a high-pressure state, while the collector drum 630 that is spatially connected with the second chamber 460 may be put in a low-pressure state.

Thus, due to the pressure difference above and below pressure the cut-off part 641, as well as an upward airflow created by a decrease in pressure at the center portion resulting from the high-speed rotation of the compressed air within the collector drum 630, the pressure cut-off part 641 may move upward.

The circular plate 642 may be positioned below the discharge pipe 431 so that the impurities collected in the collector drum 630 may not be caught by the upward airflow and discharged through the discharge pipe 431. Thus, the force of the upward airflow may be applied on the upper surface of the circular plate 642, adding to the force that raises the pressure cut-off part 641 overall.

The upward movement of the pressure cut-off part 641 may be halted as the curb 646 on each side meets the curb portion 631 of the collector drum 630.

Also, as the pressure cut-off part 641 moves upward, the hole 653 of the discharge part 650 may be opened.

As a result, the high-pressure compressed air of the lower collector space 615 may enter the upper space of the discharge part 650 through the hole 653. Due to the high pressure of the compressed air entering the upper space and the elastic force of the elastic body b 672, the discharge pin 670 may move downward.

When the discharge pin 670 moves downward, the first impurity and second impurity collected in the lower collector space 615 may be automatically discharged via the discharge port 611, in the same manner as when it moves upward. This may add to the convenience of the user, as the user does not have to perform a separate manipulation for discharging the impurities.

When the discharge pin 670 moves downwards, the high-pressure compressed air entering through the hole 653 may be discharged through an airway 680 to the exterior of the drain cover 610.

As illustrated in FIG. 7c, the discharge pin 670 may thus move downward until the discharge pin 670 contacts a protrusion on a lower surface of the lower collector space 615, at which the downward movement may be stopped. Here, an upper portion of the upper pin 671 may be put in close contact with the O-packing c 656, to block the spatial connection of the upper space 690 and the center space 692. Thus, the high-pressure compressed air entering through the hole 653 may no longer exit through the airway 680.

That is, the upper space 690 may be placed under high pressure, the center space 692 may be placed under atmospheric pressure due to the inflow of the external atmospheric air through the airway 680, and the lower space 691 may be placed under high pressure.

While in the state illustrated in FIG. 7c, if the pneumatic device is turned OFF as in FIG. 7b, then the flow of compressed air within the cyclone generator member 401 may again be stopped. Then, the collector drum 630 and the lower collector space 615 may both be put in a high-pressure state, so that the pressure cut-off part 641 may again move downwards to close the hole 653.

Also, the discharge pin 670 may again move upward, and the first impurity and second impurity may be discharged via the discharge port 611.

Also, since a drop in pressure occurs in the lower collector space 615 as soon as the first impurity and second impurity are discharged through the discharge port 611, a large pressure difference may occur instantaneously between the collector drum 630 and the lower collector space 615. Here, the second impurity in the collector drum 630 may force through the U-packing a 643 and move to the lower collector space 615.

As described above, the U-packing a 643 may be disposed with the open portion facing downward, so that when the pressure cut-off part 641 moves down, a spatial connection occurs from the collector drum 630 towards the direction of the lower collector space 615. That is, a unidirectional spatial connection occurs.

If the pressure of the lower collector space 615 were directly relieved into the collector drum 630, the swirling in the inner drum 450 and collector drum 630 would be weakened. As such, the U-packing a 643 may block the pressure from the lower collector space 615 to maintain the pressure in the collector drum 630.

That is, the U-packing a 643 serves an important part in the upward movement of the pressure cut-off part 641, and at the same time, allows the second impurity collected in the collector drum 630 to move towards the lower collector space 615.

As described above, during the process in which the cyclone generator member 401 separates the first impurity and second impurity, such as water, oil, and foreign substances, etc., from the compressed air, a pressure change (high pressure and low pressure) occurs in the first chamber 420 and second chamber 460. Since the first chamber 420, where high pressure is formed, and the second chamber 460, where low pressure is formed, spatially connect with the drain cover 610 and the collector drum 630, respectively, the impurities can be discharged automatically without a need for additional power, thus providing an economical and convenient solution.

Also, since the discharge of impurities may be performed frequently and instantaneously whenever there is a flow of compressed air in the cyclone generator member 401 for separating the first impurity and second impurity, there may be no impurities remaining stagnant in the lower collector space 615, thus preventing problems such as microorganism propagation and blockage of the discharge port 611.

The present invention is not limited to the particular preferred embodiment described above. It is to be appreciated that those of ordinary skill in the field of art to which the present invention pertains can derive various modifications without departing from the spirit of the present invention defined in the scope of claims, and that such modifications are encompassed within the scope of claims set forth below.

<Description of the Reference Numerals in the Drawings>

| | |
|---|---|
| 400: compressed air purification apparatus | |
| 401: cyclone generator member | |
| 410: cover | 411: inlet |
| 413: outlet | 415: O-packing b |
| 416: insertion port | 417: center plate |
| 420: first chamber | 430: outer drum |
| 431: discharge pipe | 432: O-packing a |
| 433: first flow guide vane | 434: first channel |
| 435: first flange | 450: inner drum |
| 451: second flow guide vane | 452: second channel |
| 460: second chamber | 501: connector ring |
| 601: drain member | 610: drain cover |
| 611: discharge port | 612: U-packing c |
| 613: support | 631: curb portion |
| 615: lower collector space | 635: elastic body a |
| 630: collector drum | 637: first sidewall |
| 633: second flange | 643: U-packing a |
| 636: inclined surface | 645: insertion drum |
| 638: second sidewall | 647: stem |

<Description of the Reference Numerals in the Drawings>

| | |
|---|---|
| 641: pressure cut-off part | 650: discharge part |
| 642: circular plate | 652: cap |
| 644: hole packing | 655: cap packing |
| 646: curb | 657: discharge slot |
| 648: lower cylinder | 671: upper pin |
| 651: discharge part body | 675: disk |
| 653: hole | 678: lower pin |
| 656: O-packing c | 690: upper space |
| 670: discharge pin | 692: center space |
| 672: elastic body b | |
| 676: U-packing b | |
| 680: airway | |
| 691: lower space | |

The invention claimed is:

1. A compressed air purification apparatus, comprising:
a cover shaped as a drum with a lower portion thereof being open, the cover being formed with an inlet and an outlet for compressed air;
an outer drum inserted in the cover to form a first chamber between an inner sidewall of the cover and an outer sidewall of the outer drum, the first chamber communicating with the inlet such that the compressed air supplied through the inlet swirls downwards through the first chamber;
a discharge pipe formed in the outer drum and communicates with the outlet, and
an inner drum inserted between the outer drum and the discharge pipe to form a first space between an inner sidewall of the outer drum and an outer sidewall of the inner drum and to form a second chamber between the inner drum and the discharge pipe to allow the compressed air to swirl downwards through the second chamber;
a collector drum integrally provided at or coupled to a lower portion of the inner drum and forming a second space between the discharge pipe and the inner drum to allow the compressed air to flow;
a drain cover provided at the lower portion of the cover to form a third space between the collector drum and the drain cover, the third space communicating with the first space, the drain cover being configured such that impurities separated from the compressed air flowing in the cover are collected therein;
a first channel formed on an uppermost surface of the outer drum along a perimeter of the upper surface of the outer drum such that the compressed air supplied from the inlet flows in the first chamber through the first channel; and
a second channel formed along a perimeter of an upper end of the inner drum such that the compressed air from the first space flows in the second chamber through the second channel,
wherein the compressed air purification apparatus has a structure configured to allow the compressed air to flow from the inlet to the first chamber through the first channel, the first chamber to the third space, the third space to the first space, and then the first space to the second chamber through the second channel, and then is discharged through the outlet via the discharge pipe.

2. The compressed air purification apparatus according to claim 1, wherein the inner drum decreases in diameter along a downward direction, such that a swirling speed of the compressed air is increased.

3. The compressed air purification apparatus according to claim 2, further comprising:
a pressure cut-off part disposed in the collector drum and configured to move up or down according to a pressure difference between an inner lower portion of the drain cover and an inside of the collector drum.

4. The compressed air purification apparatus according to claim 1, wherein a first impurity is separated from the compressed air at a position between the cover and the outer drum, and a second impurity is separated at a position between the inner drum and the discharge pipe;
the first impurity is gathered at an inner lower portion of the drain cover communicating with the cover, and the second impurity passes through the collector drum and is gathered at the inner lower portion of the drain cover; and
a discharge unit is provided in the drain cover to discharge the first and second impurities.

5. The compressed air purification apparatus according to claim 4, wherein the discharge unit includes:
a discharge part having a hole communicating with the inner lower portion of the drain cover to discharge the first and second impurities depending on an opened or closed state of the hole; and
a pressure cut-off part disposed in the collector drum and configured to open or close the hole by moving up or down according to a pressure difference between the inner lower portion of the drain cover and an inside of the collector drum.

6. The compressed air purification apparatus according to claim 1, further comprising:
an insertion port protruding at a center of a lower portion of the cover to communicate with the outlet,
wherein the discharge pipe is inserted into the insertion port such that the discharge pipe and the cover are coupled to each other.

7. The compressed air purification apparatus according to claim 1, further comprising:
a discharge unit provided in the drain cover to discharge impurities.

8. The compressed air purification apparatus according to claim 7, wherein the discharge unit includes:
a discharge part having a hole communicating with the inner lower portion of the drain cover to discharge the impurities depending on an opened or closed state of the hole; and
a pressure cut-off part disposed at an upper portion of the discharge part by being inserted in the collector drum and configured to open or close the hole, wherein the pressure cut-off part is configured such that a lower portion thereof communicates with the first chamber through the third space, and an upper portion thereof communicates with the second chamber to open or close the hole by moving up or down according to a pressure difference between the first chamber and the second chamber.

9. The compressed air purification apparatus according to claim 8, wherein the impurities are gathered at the inner lower portion of the drain cover;
the drain cover is provided with a discharge port at a lower portion thereof to discharge the impurities; and
the discharge part includes a discharge pin configured to open and close the discharge port,
wherein the discharge pin opens and closes the discharge port by sliding in the discharge part depending on the opened or closed state of the hole; and the impurities are discharged from the inner lower portion of the drain cover to an outside of the drain cover through the discharge port.

10. The compressed air purification apparatus according to claim 9, wherein the drain cover is provided with a support protruding inward from the drain cover to support the collector drum; and the discharge port is formed at a lower portion of the support.

11. The compressed air purification apparatus according to claim 10, wherein the impurities include:

a first impurity produced in the first chamber and gathered at the inner lower portion of the drain cover; and a second impurity produced in the second chamber and gathered at the collector drum, wherein the second impurity moves from the collector drum to a lower portion of the drain cover by passing between the collector drum and the pressure cut-off part when the pressure cut-off part moves down.

12. A compressed air purification apparatus, comprising:

a cover shaped as a drum with a lower portion thereof being open, the cover being formed with an inlet and an outlet for compressed air;

an outer drum inserted in the cover, and configured such that compressed air supplied through the inlet swirls downwards through a space formed between the cover and the outer drum;

a discharge pipe formed in the outer drum and communicates with the outlet;

an inner drum inserted between the outer drum and the discharge pipe, and is configured to allow compressed air to swirl downwards;

a collector drum integrally provided at or coupled to a lower portion of the inner drum forming a space between the discharge pipe and the inner drum to allow compressed air to flow;

a drain cover provided at the lower portion of the cover, the drain cover being configured such that impurities separated from the compressed air flowing in the cover are collected therein;

wherein the compressed air is discharged through the outlet via a first chamber and a second chamber, the first chamber communicating with an inner lower portion of the drain cover through a space between the collector drum and the drain cover;

a discharge unit is provided in the drain cover to discharge impurities;

the discharge unit includes:

a discharge part having a hole communicating with the inner lower portion of the drain cover to discharge the impurities depending on an opened or closed state of the hole; and a pressure cut-off part disposed at an upper portion of the discharge part by being inserted in the collector drum and configured to open or close the hole, wherein the pressure cut-off part is configured such that a lower portion thereof communicates with the first chamber through the space, and an upper portion thereof communicates with the second chamber to open or close the hole by moving up or down according to a pressure difference between the first chamber and the second chamber;

wherein the impurities are gathered at the inner lower portion of the drain cover;

the drain cover is provided with a discharge port at a lower portion thereof to discharge the impurities;

the discharge part includes a discharge pin configured to open and close the discharge port;

the discharge pin opens and closes the discharge port by sliding in the discharge part depending on the opened or closed state of the hole;

the impurities are discharged from the inner lower portion of the drain cover to an outside of the drain cover through the discharge port;

the drain cover is provided with a support protruding inward from the drain cover to support the collector drum; and the discharge port is formed at a lower portion of the support;

the impurities include:

a first impurity produced in the first chamber and gathered at the inner lower portion of the drain cover; and a second impurity produced in the second chamber and gathered at the collector drum, wherein the second impurity moves from the collector drum to a lower portion of the drain cover by passing between the collector drum and the pressure cut-off part when the pressure cut-off part moves down;

wherein the discharge pin includes:

a disk placed to be in close contact with an inner circumferential surface of the discharge part to block communication between upper and lower parts of the discharge part;

an upper pin with a diameter smaller than a diameter of the disk, the upper pin being provided with an elastic body; and a lower pin with a diameter smaller than the diameter of the disk, the lower pin being configured to open and close the discharge port, wherein the lower pin is configured such that a diameter at a center portion thereof is smaller than diameters of upper and lower portions thereof.

13. The compressed air purification apparatus according to claim 12, wherein an airway is formed through the disk, the upper pin, and the lower pin, such that the outside of the drain cover and an inner upper portion of the discharge part communicate with each other;

an inner lower portion of the discharge part and an inside of the drain cover communicate with each other through discharge slots formed at a lower portion of the discharge part to allow the impurities to flow therethrough; and the inner upper portion of the discharge part communicates with the inside of the drain cover through the hole.

14. A compressed air purification apparatus, comprising:

a cover shaped as a drum with a lower portion thereof being open, the cover being formed with an inlet and an outlet for compressed air;

an outer drum inserted in the cover to form a first chamber between the cover and the outer drum, the first chamber communicating with the inlet such that the compressed air supplied through the inlet swirls downwards through the first chamber;

a discharge pipe formed in the outer drum and communicates with the outlet; and an inner drum inserted between the outer drum and the discharge pipe to form a second chamber between the inner drum and the discharge pipe to allow the compressed air to swirl downwards through the second chamber;

a collector drum integrally provided at a lower portion of the inner drum and communicated with the first chamber and the second chamber and forming a space between the discharge pipe and the inner drum to allow compressed air to flow;

a drain cover provided at the lower portion of the cover, the drain cover being configured such that impurities separated from the compressed air flowing in the cover are collected therein;

a compressor connected to the inlet a pneumatic device connected to the outlet and a pressure cut-off part disposed in the collector drum to block a pressure of the first chamber and the second chamber and configured to move up or down according to the pressure difference between the first chamber and the second chamber.

15. A compressed air purification apparatus, comprising:

a cover having an inlet into which compressed air enters and an outlet through which the compressed air is discharged;

an outer drum disposed inside the cover to form a first chamber, such that foreign substances in the compressed air are removed by moving the compressed air along an inner surface of the cover in the first chamber;

an inner drum disposed inside the outer drum, the diameter of which decreases from the top towards the bottom;

a discharge pipe connected to the outlet and disposed inside the inner drum to form a second chamber, such that the discharge pipe is formed in a vertical direction, an end of which is shorter than a lower end of the inner drum; and a discharge unit disposed in a lower portion of the inner drum to remove the foreign substances, wherein the compressed air passes through the second chamber and then passes through an end of the discharge part, and is abruptly expanded upon reaching an area of the inner drum, inside of which the discharge pipe is not present, thereby allowing the foreign substances to be removed; and the inlet into which the compressed air enters is formed in a central area of the cover;

a space is formed on the upper portion of the outer drum, so that the compressed air entering into the inlet can be discharged from the central area in a circumferential direction of the cover, a plurality of a first flow guide vanes unidirectionally inclined are disposed in a position isolated from the central area, and the compressed air entering into the central area of the cover moves in a radial direction, and rotates along an inner wall of the cover, with a rotational force received when the compressed air moves between the first flow guide vanes.

16. The compressed air purification apparatus according to claim 15, wherein second flow guide vanes disposed along the circumferential direction are formed on the upper portion of the inner drum; and the compressed air moving between the outer drum and the inner drum moves to the second chamber, with a rotational force received according to the second flow guide vane.

17. The compressed air purification apparatus according to claim 15, wherein the discharge unit comprises a pressure cut-off part, a lower portion of which is connected to the first chamber and an upper portion of which is connected to the second chamber, whereby the pressure cut-off part vertically moves according to the pressures of the first chamber and the second chamber, thereby moving the foreign substances.

18. The compressed air purification apparatus according to claim 17, further comprising a drain cover communicating with the first chamber in the lower portion of the cover.

19. The compressed air purification apparatus according to claim 18, wherein the inner drum comprises a collector drum in which the pressure cut-off part is disposed, and the collector drum is disposed to meet an inner surface of the drain cover.

20. The compressed air purification apparatus according to claim 15, wherein the compressed air purification apparatus has a structure configured to allow the compressed air entered into the inlet to move in a flow path between the cover and the outer drum, a flow path between the outer drum and the inner drum, and a flow path between the inner drum and the discharge pipe, thereafter being discharged to the outlet through the discharge pipe.

21. The compressed air purification apparatus according to claim 20, wherein the compressed air purification apparatus has a structure configured to allow the compressed air entering into the central area to be bent from the outside to the inside in lower portions of the outer drum and the inner drum, and upper portions of the inner drum and the discharge pipe, thereby allowing the foreign substances to be removed in the center and moved to the discharge part through which the foreign substances are discharged to the outlet.

* * * * *